Nov. 16, 1926.  1,607,083
A. IGNATIEFF
PROCESS FOR MANUFACTURING CUTTING OR PIERCING INSTRUMENTS
Filed July 10, 1925
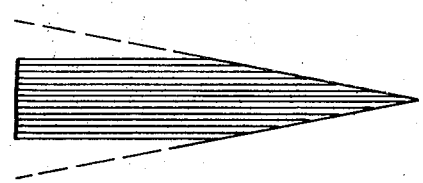
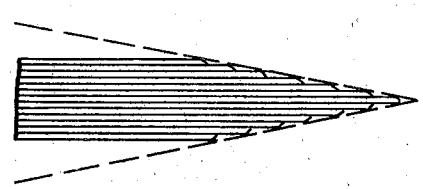
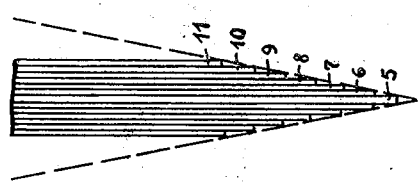
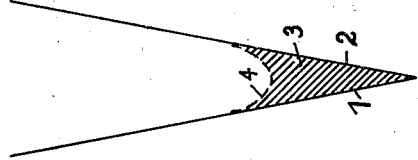

Patented Nov. 16, 1926.

1,607,083

UNITED STATES PATENT OFFICE.

ALEXANDER IGNATIEFF, OF MOSKAU, RUSSIA.

PROCESS FOR MANUFACTURING CUTTING OR PIERCING INSTRUMENTS.

Application filed July 10, 1925, Serial No. 42,861, and in Germany August 19, 1924.

Usual instruments for cutting, piercing or shaving bodies become blunt in use, as their cutting angle becomes greater owing to the wear and tear which is the greatest at the edge and decreases against the other parts. Resharpening therefore must be effected by grinding or the like.

The invention consists in forming the points or cutting edges of different materials in such manner, that the hardness on every single spot essentially corresponds to the load and wear to be sustained on said spot. Thereby the whole surface near the cutting edge is uniformly worn out, which means that the cutting angle remains unaltered and the instrument remains sharp.

The different layers of material can be produced for instance by using a steel with much carbon or other hardening substances and correspondingly high hardening faculties and depriving this steel, on the spots of less and less wear, of greater and greater parts of its carbon content; thus the hardness becomes the greatest at the cutting edge or point and diminishes according to the wears. With special advantage it is possible to compose the instrument of single layers or sheets and to unite them by welding, electrolytic deposition or spouting (for instance in the processes of Meurer or Schoop); in this case the hardness and thickness of the layers can be very correctly measured.

The invention is illustrated in the drawing by way of examples;

Fig. 1 is a cross-section of a usual knife, in which by dash and dotted lines the shape arising by wear is shown;

Fig. 2 is a cross-section of a similar knife made according to the invention;

Fig. 3 is a cross-section of an unsymmetric knife, for instance for shears;

Fig. 4 is a point view of a needle;

Fig. 5 is a cross-section of a knife of the new kind after being worn out; and

Fig. 6 is a similar section, the knife being ground.

According to Fig. 1 the surfaces 1, 2 of the usual knife include the small cutting angle. In the use the shaded part 3 is worn out, so that the cutting edge is formed by the dash and dotted line 4, the front part of which furnishes a very blunt cutting angle.

According to Fig. 2 the new knife consists of a very hard layer 5 which here lies in the middle plane and to which gradually weaker layers 6 to 11 are applied on both sides. These layers may have for usual instruments a gauge of 0,1 mm., or for specially fine knives a gauge of 0,01 mm. They are separately manufactured of the adapted more or less hard steels and welded together by any known process.

It is also possible to manufacture the strongest layer 5 separately and deposit the other layers 6 to 11 electrolytically. Thereat by constant altering the composition of the bath the entire deposit can be produced as a coherent body, the hardness of which decreases outwardly. It is also possible to deposit the layers one after another in different baths of different compositions. In a similar way on the strongest layer 5 the further layers may be added by a metal spouting apparatus, the different hardnesses being attained by differently heating the metal (between melting and half warm temperatures on the depositing spot); or differently hard metals or alloys may be deposited.

According to Fig. 3 a blade for shears or chisels, composed in the process of the invention, has the hardest layer 5 on one side, as there arises the greatest wear.

According to Fig. 4 a needle is formed by enveloping a hard core 5 with tubular layers of weaker material; the longitudinal section is equal to Fig. 2.

Fig. 5 shows such a knife or needle, on which the edges of the single layers are rounded by wear. This causes no damage as at all the steps formed by the single layers are very small. Where absolute smoothness is necessary, the fine steps can be ground flat, or the layers must be produced with constantly decreasing hardness as above described in relation to electrolytic and metal spouting processes (Fig. 6).

I claim:

A process of manufacturing cutting and piercing instruments in a known way by welding, electrolytically, or casting, and forming thereby cutting edges or points of several layers of different materials of different grades of hardness consisting therein, that at least five layers of thickness not exceeding 1 mm. are used in such manner that the hardness at different spots corresponds to the stresses and wears arising in the use.

In witness whereof I affix my signature.

ALEXANDER IGNATIEFF.